US008617265B2

(12) United States Patent
Chellappa

(10) Patent No.: US 8,617,265 B2
(45) Date of Patent: Dec. 31, 2013

(54) HYDROGEN GENERATION APPARATUS INCORPORATING A STAGED CATALYST AND METHOD FOR USING SAME

(75) Inventor: Anand Chellappa, Albuquerque, NM (US)

(73) Assignee: Intelligent Energy, Inc., Sunnyvale, CA (US)

( * ) Notice: Subject to any disclaimer, the term of this patent is extended or adjusted under 35 U.S.C. 154(b) by 711 days.

(21) Appl. No.: 10/599,813

(22) PCT Filed: Apr. 12, 2005

(86) PCT No.: PCT/US2005/012458

§ 371 (c)(1),
(2), (4) Date: Jul. 17, 2007

(87) PCT Pub. No.: WO2005/099885

PCT Pub. Date: Oct. 27, 2005

(65) Prior Publication Data

US 2008/0003461 A1 Jan. 3, 2008

(51) Int. Cl.
*B01J 7/00* (2006.01)
*B01J 8/00* (2006.01)
*B01J 10/00* (2006.01)

(52) U.S. Cl.
USPC ............ 48/61; 48/127.9; 48/127.1; 48/197 R; 48/127.5; 48/128; 48/198.6; 422/190; 422/187; 422/188; 422/189; 422/630; 422/635; 422/600; 422/602; 422/625; 422/626; 422/628; 422/629; 422/631; 422/638; 422/644

(58) Field of Classification Search
USPC .................................. 422/187–190; 423/651
See application file for complete search history.

(56) References Cited

U.S. PATENT DOCUMENTS

| | | | | |
|---|---|---|---|---|
| 6,083,425 | A * | 7/2000 | Clawson et al. | 252/372 |
| 6,436,363 | B1 * | 8/2002 | Hwang et al. | 423/651 |
| 7,150,866 | B2 * | 12/2006 | Wieland et al. | 423/652 |
| 2002/0081253 | A1 * | 6/2002 | Abe | 422/211 |
| 2002/0146359 | A1 * | 10/2002 | Lomax et al. | 422/198 |
| 2003/0064887 | A1 * | 4/2003 | Korotkikh et al. | 502/329 |
| 2004/0063577 | A1 * | 4/2004 | Wieland et al. | 502/339 |
| 2004/0168367 | A1 * | 9/2004 | Suenaga et al. | 48/127.9 |

FOREIGN PATENT DOCUMENTS

WO WO 00/72954 A1 12/2000

* cited by examiner

*Primary Examiner* — Kaity V. Handal
(74) *Attorney, Agent, or Firm* — Baker Hostetler, LLP

(57) ABSTRACT

A method and apparatus for generation of hydrogen. The apparatus includes a hydrogen reactor chamber (99) and a plurality of catalysts within the chamber (99) forming distinct zones or portions (200, 202, and 204), each zone or portion comprising a distinct catalyst or combination thereof. The plurality of catalysts include at least one of a high-activity steam reformation catalyst, coke resistant steam reformation catalyst and steam reformation catalyst that promotes a water gas shift reaction.

18 Claims, 12 Drawing Sheets

99
105
104
108
100
101
102
106
110
204
202
200

105
104

108
100
101
102
99
106
110
108
104
105
99
106
110

HYDROGEN GENERATION APPARATUS INCORPORATING A STAGED CATALYST AND METHOD FOR USING SAME

RELATED APPLICATIONS

This application claims priority of U.S. Provisional Application No. 60/561,750 filed on Apr. 12, 2004, and of PCT application No. PCT/US04/37620 filed on Nov. 11, 2004, all herein incorporated by reference in their entirety.

This application is a U.S. national stage filing under 35 U.S.C. 371 of International Application No: PCT/US2005/012458, filed on Apr. 12, 2005, which claims the benefit of U.S. Application No. 60/561,750, filed on Apr. 12, 2004 and International PCT Application No: PCT/US2004/037620, filed on Nov. 11, 2004. The entire teachings of the referenced Applications are incorporated herein by reference. International Application PCT/US2005/012458 was published under PCT Article 21(2) in English.

FIELD OF THE INVENTION

The present invention generally relates to the chemical arts. More particularly, the present invention relates to an apparatus and method for generating hydrogen gas by the steam reformation of hydrocarbons.

BACKGROUND OF THE INVENTION

The growing popularity of electronic devices has produced an increased demand for electrical power sources to energize these devices. At present, storage or rechargeable batteries are typically used to provide independent electrical power sources for electronic devices. However, the amount of energy that can be stored in storage or rechargeable batteries is insufficient to meet the need of certain applications.

Fuel cells, including hydrogen/air fuel cells (H/AFCs) have enormous potential as a replacement for batteries. Fuel cells can operate on very energy-dense fuels. Some fuel cell-based power supplies offer high energy-to-weight ratios compared with even state-of-the-art batteries.

Functionally, fuel cells generate electricity by reacting hydrogen with oxygen to produce water. For example, in a PEM H/AFC hydrogen atoms pass through a membrane as H+ while the electrons travel around the membrane, the H+s join with oxygen, on the otherside of the membrane to form water. Since oxygen can typically be obtained from the ambient atmosphere, only a source of hydrogen must be provided to operate a fuel cell. Merely providing compressed hydrogen is not always a viable option, because of the substantial volume that even a highly compressed gas occupies. Liquid hydrogen, which occupies less volume, is a cryogenic liquid, and a significant amount of energy is required to maintain the extremely low temperatures required to maintain it as a liquid. Furthermore, there are safety issues involved with the handling and storage of hydrogen in the compressed gas form or in the liquid form.

Among the most desirable alternative hydrogen sources is hydrogen produced by the steam reformation of hydrocarbons, particularly $C_1$-$C_4$ hydrocarbons. For example, $C_1$, methane, as natural gas, and $C_3$, propane, are used for residential, mobile home and recreational services, while propane and $C_4$, butane, are used as fuels for backpack stoves.

Following are the reaction equations for the steam reforming method, where methane is the feedstock:

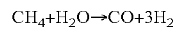

$$CH_4+H_2O \rightarrow CO+3H_2 \quad \text{Equation (1)}$$

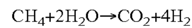

$$CH_4+2H_2O \rightarrow CO_2+4H_2 \quad \text{Equation (2)}$$

It is a drawback of the reformation of such hydrocarbon fuels, that coke, a solid residue which reduces the activity and lifetime of the steam reformation and catalyst and is undesirable in a fuel cell application, is formed. Consequently, there is a desideratum for an apparatus and method that has the flexibility to effectively and efficiently generate hydrogen from $C_1$-$C_4$ hydrocarbon fuels without necessitating a change in the catalyst, while minimizing the production of coke residue.

SUMMARY OF THE INVENTION

Now in accordance with this invention there has been found a hydrogen generation apparatus for use with fuel cells and other applications wherein generation of hydrogen is required or desirable.

According to a first aspect a method for generating hydrogen is disclosed, the method comprising providing a reactor chamber; providing a plurality of catalysts within the reactor chamber to form a staged catalyst medium; and passing a fuel feed stream, such as a hydrocarbon fuel stream, in the reactor chamber to produce hydrogen or a hydrogen containing product gas.

Providing a plurality of catalysts within the reactor chamber can be performed by packing or loading the plurality of catalysts in the staged catalyst medium within the chamber.

A staged catalyst medium is a medium comprising a series of distinct zones or portions, each zone or portion comprising a distinct catalyst or combination thereof having a unique definitive characteristic. A definitive characteristics, is a characteristic of the catalyst or combination thereof identifying a physical and/or chemical property of the catalyst or combination thereof which is associated with the hydrogen generation as performed in the apparatus.

Zones boundaries may vary. Zone boundaries may be characterized by an abrupt end to the catalysts, may be characterized by a decreasing or increasing gradient of one or more catalysts or catalytic activity, or may be characterized by any combination thereof.

Each zone or portion comprises a catalyst or combination thereof such that the definitive characteristic of the catalyst or combination thereof is unique, i.e. not presented by catalysts or combination thereof comprised in other zones or portions of the staged catalyst medium.

A definitive characteristic of the catalyst in each zone or portion and the location of the zones or portions in the staged catalyst medium is a function of a desired effect to be performed in the zone or portion, the effect associated with the hydrogen generation performed in the reactor, the structure and/or the operation mode of the reactor.

In some exemplary implementations, the plurality of catalysts are packed or loaded in the staged catalyst medium within the reactor chamber such that the feed stream passed in the reactor chamber is exposed to the plurality of catalysts in a predetermined sequential manner. The predetermined sequential manner can be determined in view of several factors associated with the desired production of hydrogen, such as the selected hydrogen generating reaction to be performed in the reactor, presence and location of pre-reformation zones in the reactor, selection of operating mode of the reactor.

Accordingly, in exemplary implementations wherein the hydrogen generation is performed by steam reformation, providing a plurality of catalysts within the reactor chamber in a staged catalyst medium can be performed such that a steam reformation catalyst is located in the staged catalyst medium in a zone adjacent the entrance portion and/or typically exit portion of the hydrogen reactor chamber, the catalysts promoting a water-gas shift reaction.

Also, in exemplary implementations, wherein a pre-reformation zone is included in the chamber, providing a plurality of catalysts within the reactor chamber in a staged catalysts medium can be performed such that a steam reformation catalysts is located in the staged catalyst medium in a zone located in the prereformation zone.

In exemplary implementations, wherein a hydrogen separation membrane is included in the reactor, providing a plurality of catalysts within the reactor chamber can be performed such that hydrogen that is contained in the product gas can be separated through a palladium based membrane that is located either internal or external to the reactor.

Additionally, providing a plurality of catalysts within the reactor chamber in a staged catalyst medium can be performed such that a predetermined catalyst is packed or loaded in the staged catalyst medium in a zone located in a portion of the reactor wherein the temperature is adjusted to enhance the performance of the catalysts in the reactor.

Providing a plurality of catalysts within the reactor chamber in a staged catalyst medium can also be performed such that staged catalyst medium includes a first portion having at least one of a high-activity steam reformation catalyst and a coke-resistant steam reformation catalyst and a second portion having a steam reformation catalyst that promotes a water-gas shift reaction, located adjacent exit portion of the hydrogen reactor chamber.

Providing a plurality of catalysts within the reactor chamber in a staged catalyst medium can be performed so that the staged catalyst medium comprises a plurality of catalysts provided and comprised of at least one of a high-activity steam reformation catalyst and a coke-resistant steam reformation catalyst. In some exemplary implementations the plurality of catalysts is further comprised of a steam reformation catalyst that promotes a water-gas shift reaction.

Providing a plurality of catalysts within the reactor chamber in a staged catalyst medium can be performed so that the coke-resistant steam reformation catalyst is loaded at an entrance of the hydrogen reactor chamber, followed by a high-activity steam reformation catalyst. Alternatively, all or part of the coke-resistant steam reformation catalyst can be mixed with the high-activity steam reformation catalyst before loading into the hydrogen reactor chamber.

Providing a plurality of catalysts within the hydrogen generating apparatus in a staged catalyst medium and/or passing a feed stream in the reactor chamber can also be performed such that the high reforming and water gas shift activity features of at least one catalyst is balanced with resistance to coking.

The method can also comprise adjusting the operating parameters of the hydrogen generating apparatus to enhance the performance of the plurality of catalyst in the staged catalyst medium. In particular, the temperature of the reactor can be adjusted so that the zone including a determined catalyst is brought at the desired operating temperature of the catalysts for example by employing heat exchange.

According to a second aspect a hydrogen generation apparatus is disclosed, the apparatus comprising a reactor chamber, the reactor chamber comprising a plurality of catalysts in a staged configuration, wherein the plurality of staged catalysts is provided in a staged catalyst medium. In particular, the plurality of catalysts can be located in the reaction chamber in any of the staged catalyst medium herein described.

The staged catalyst medium can also be located in other portions of the hydrogen generating apparatus, such as prereformer, wherein hydrogen producing reactions and/or additional reactions associated with hydrogen production in the apparatus are performed.

According to a third aspect, a hydrogen generating apparatus wherein hydrogen is generated by steam reformation of a hydrocarbon fuel is disclosed. The apparatus comprises a steam reformer wherein a reaction resulting in steam reformation of a hydrocarbon fuel is performed, the steam reformer including a portion having a plurality of steam reformation catalysts disposed therein.

The plurality of steam reformation catalysts can be provided in a staged configuration, wherein the plurality of catalysts are included in a staged catalyst medium. In particular, the plurality of catalysts can be located in the steam reformer in any of the staged catalyst medium herein described.

The staged configuration can in particular include a staged catalyst medium including a coke-resistant steam reformation catalyst loaded at an entrance of the steam reformer. Furthermore, the plurality of steam reformation catalysts in the staged catalyst medium can include at least two of a high-activity steam reformation catalyst, a coke-resistant steam reformation catalyst and a steam reformation catalyst which promotes a water-gas shift reaction. The high-activity steam reformation catalyst can be a supported nickel-based catalyst and the coke-resistant steam reformation catalyst can be a supported doped nickel-based catalysts. In an embodiment, the supported doped nickel-based catalyst can be comprised of at least one of calcium oxide, potassium oxide and calcium aluminate or combinations thereof.

In some exemplary implementations the supported doped nickel-based catalysts is further comprised of at least one noble metal, such as at least one of platinum, palladium, and rhodium or combination thereof. The coke-resistant stream reformation catalyst can be loaded at an entrance of the steam reformer, followed by the high-activity steam reformation catalyst.

According to a fourth aspect, a method for generating hydrogen by steam reformation of a hydrocarbon fuel is disclosed. The method comprises providing a steam reformer; providing a plurality of catalysts within the steam reformer in a staged catalyst medium; passing a hydrocarbon fuel feed stream in the steam reformer to obtain a hydrogen containing reformed stream, the reformed stream purified to produce hydrogen.

Providing a plurality of catalysts in the steam reformer to form a staged catalysts medium can include locating the plurality of catalysts to form a staged catalyst medium in the steam reformer in any of the staged catalyst medium herein described wherein the chemical and/or physical activity associated with hydrogen production is also associated to steam reformation reactions. Purification of the hydrogen can be achieved by hydrogen separation membranes that are situated either internal or external to the steam reformer.

The feed stream of hydrocarbons can be a fuel having at least one of a $C_1$-$C_4$ hydrocarbon or mixture or oxygenate thereof. Catalysts may be provided on a number of useful carriers, such as foams, monoliths, felts, pellets or powders, or any combination thereof.

According to a fifth aspect, a method for manufacturing a hydrogen generation apparatus is disclosed, the method comprises providing an element or component of the hydrogen generation apparatus wherein a reaction associated with hydrogen production is performed, such as a reaction chamber; and providing within said element a plurality of catalysts to form a staged catalyst medium, the staged catalyst medium comprising a series of distinct zones or portions, each zone or portion comprising a distinct catalyst or combination thereof. The reaction chamber is preferably a steam reformer.

The hydrogen generation apparatuses herein disclosed can also comprise a other elements or components identifiable by a person skilled in the art, such as fuel supply, a water supply, an oxygen supply, an air intake, and a vaporizer. Each of the elements included in the hydrogen generation apparatus according to the disclosure are connected to other elements by related lines identifiable by a person skilled in the art.

According to the teachings of the present invention, exemplary methods and apparatuses can provide for at least 300 sccm of a reformed stream containing about 60% hydrogen produced in conjunction with residence times of less than about 0.5 sec, preferably less than about 0.4 sec. In a particular embodiment, the at least one $C_1$-$C_4$ hydrocarbon is propane and provides hydrogen production at residence times of about 0.15 to about 0.30 sec, preferably from about 0.20 to about 0.28 sec at about 575° C. Such a reformed gas stream containing hydrogen, when routed to a fuel cell such as a solid oxide fuel cell (SOFC), is capable of generating about 15 to 25 W of power based on the characteristics of the SOFC.

The features believed to be novel are set forth within. However, the features both as to configuration, and method of operation, and the advantages thereof, may be best understood by reference to the following descriptions taken in conjunction with the diagrams, figures and accompanying drawings.

BRIEF DESCRIPTION OF THE FIGURES

The foregoing aspects and many of the attendant advantages of this invention will become more readily appreciated as the same becomes better understood by reference to the following detailed description, when taken in conjunction with the accompanying figures, wherein.

DETAILED DESCRIPTION OF THE PREFERRED EXEMPLARY IMPLEMENTATIONS

Particular exemplary implementations of the invention are described below in greater detail for the purpose for illustrating its principles and operation. However, various modifications may be made, and the scope of the invention is not limited to the exemplary exemplary implementations or operation described. For example, while specific reference is made to a reactor containing a channeled insert, it can be appreciated that any reactor suitable for the steam reformation of $C_1$-$C_4$ hydrocarbons can be advantageously employed.

It is advantageous that the hydrogen generators provided, with only minor modifications, can be used to generate hydrogen from $C_1$-$C_4$ hydrocarbons and combinations thereof, without changing catalysts thereby facilitating multi-fuel reforming. In some exemplary implementations the hydrocarbon feed can be switched from one to another while the reactor is under operation facilitating hot-swapping of fuels. For example, the hydrogen generator is useful with a combination 60% butane and 40% propane available commercially available as Powermax fuel, from Coleman Company (Wichita, Kans.). Such hydrocarbons are conventionally stored and transported as liquefiable gases.

Figure 1:
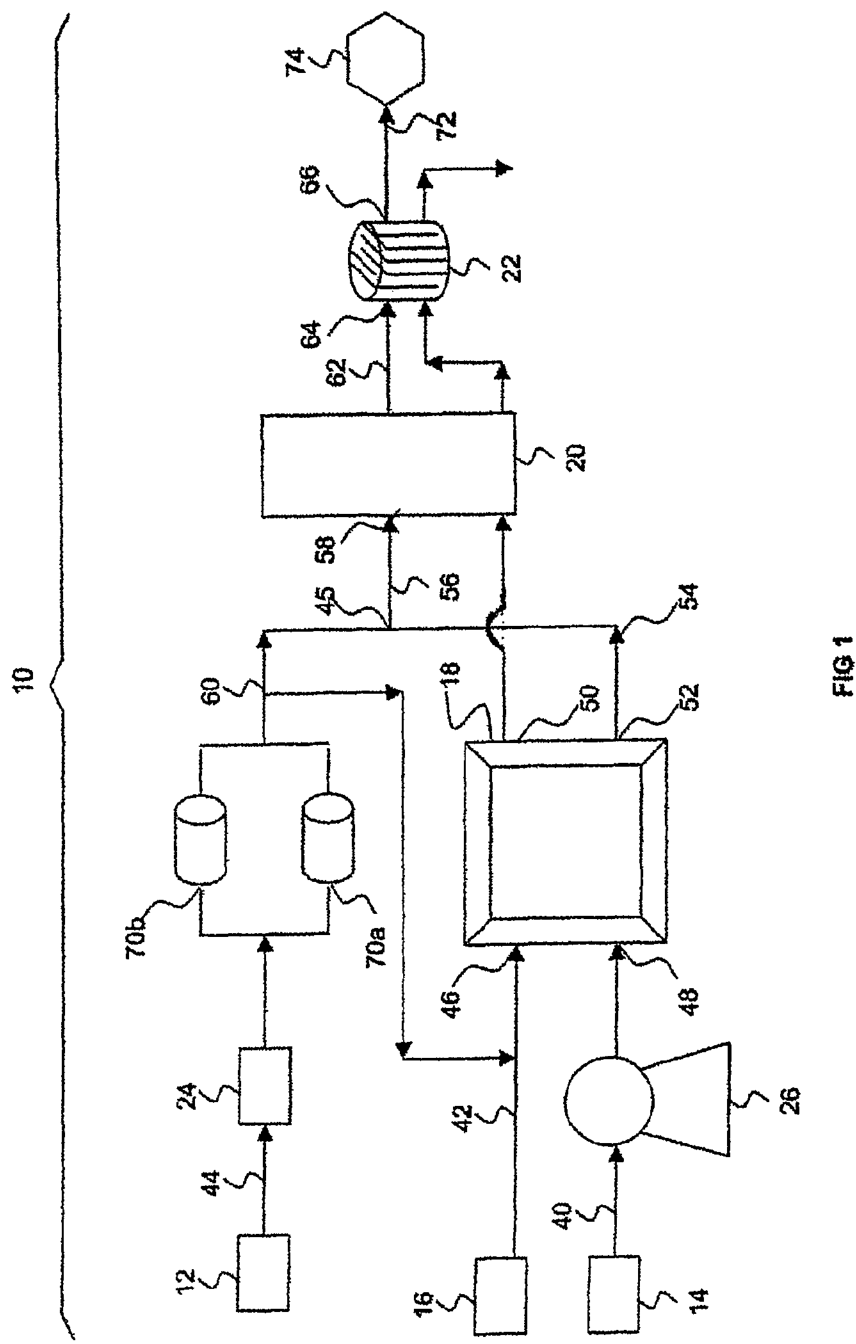
FIG. 1 shows a block diagram illustrating the primary components of a hydrogen generator in accordance with the present invention.

FIG. 1 shows an exemplary hydrogen generator 10. This hydrogen generator can be supplied with one or more $C_1$-$C_4$ hydrocarbon fuels and water to generate hydrogen gas. The hydrogen generator includes a fuel supply 12, a water supply 14, and an oxygen supply 16, e.g., an ambient air intake, a vaporizer 18, a preheater 20, and a steam reformer 22. The hydrogen generator preferably includes a water storage tank (not shown), a fuel pressurizer 24 (if needed), and a water pump 26.

Appropriate fluid conduits or lines are included as shown, and arrowheads incorporated into such fluid conduits indicate the proper flow of fluid through the hydrogen generator. A water supply conduit 40 and an air supply conduit 42 provide a fluid connection between the water supply 14 and the vaporizer 18 and the air supply 16 and the vaporizer, respectively. A fuel supply conduit 44 provides a fluid connection between the fuel supply 12 and a mixing tee 45.

The embodiment shown in FIG. 1 includes a first pair of sulfur adsorption beds 70*a* and 70*b* located in the fuel supply conduit 44, between the fuel supply 12 and the mixing tee 45. While adsorption bed 70*a* is online, removing sulfur from the natural gas or some other $C_1$-$C_4$ hydrocarbon feed, adsorption bed 70*b* is regenerated and vice versa.

Suitable sulfur adsorbents include activated carbon, molecular sieves and zinc oxide. A preferred sulfur adsorbent is regenerable activated carbon containing a transition metal such as copper and/or iron. Such regenerable catalysts as are available from Nucon International (Columbus, Ohio).

The vaporizer 18 has an oxygen inlet 46, a water inlet 48, and a steam outlet 50. Since vaporization is endothermic, the vaporizer also includes a combustor to supply the heat necessary for vaporization by combustion of the fuel. The combustion product gases, i.e., carbon dioxide and water, exit the vaporizer through a combustion products outlet 52 into a combustion products line 54.

The hydrogen generator 10 can include an additional stream splitter 60 located in the fuel supply conduit 44. The splitter directs a predetermined amount of the fuel to the combustor integrated with the vaporizer 18, to the combustor integrated with the preheater 20 and to the combustor integrated with the steam reformer 22.

Fuel, and steam leaving the vaporizer 18, are combined in the mixing tee 45 and then directed through a feed gas line 56 to a preheater feed gas inlet 58. In a preferred embodiment the steam is present in an amount in excess to the stoichiometric value, that is, typically between 1 and 2. In preferred embodiments, the actual steam to carbon ratio is between 2 and 3.

In one exemplary implementation, the preheater is a section of tubing packed with an inert particulate material. Suitable particulate materials include quartz, white sand, and alumina, with quartz being most preferred. In one preferred embodiment, the preheater 20 is made of a section of stainless steel tubing. The tubing is packed with quartz particles to yield a ratio of tubing length to equivalent particle diameter (L/dp) of from about 50:1 to about 100:1 preferably about 150:1 and a ratio of tubing internal diameter to equivalent particle diameter (D/dp) of from about 5:1 to about 10:1, preferably about 9:1. The mixture is heated to within 50° C. of the desired reaction temperature, e.g., to from about 525° C. to about 575° C., before it is directed out of a preheated feed gas outlet into a preheated feed gas line 62. The hot combustion product gases, i.e., carbon dioxide and water, exiting the vaporizer through a combustion products outlet 52 into a combustion products line 54, is routed to the pre-heater 20 to supply heat required for pre-heating. In one embodiment, the pre-heater section can be a portion of the reactor chamber itself.

The steam reformer 22 has a preheated feed gas inlet 64, in fluid connection with the preheated gas line 62, and a reformed gas outlet 66. Since reformation is endothermic, the steam reformer 22 also includes a combustor to supply the heat necessary for reformation by combustion of the fuel.

In one exemplary implementation, the steam reformer 22 is a hydrogen membrane reactor as described in PCT/US02/12822, filed Apr. 23, 2002, which application is herein incorporated by reference.

In other exemplary implementations, the steam reformer can be a MesoChannel Reactor (see below) wherein the channels of the hydrogen membrane reactor preferably have a height and/or width between 0.01 mm and 10 mm, more preferably between 0.5 an 1.0 mm, and still more preferably between 0.4 and 0.5 mm. The aspect ratio (height/width) of the channels is generally greater than 2, preferably greater than 4, and more preferably greater than about 4.5.

In some exemplary implementations the catalysts can be introduced by the coldspray technique described in PCT Application No. PCT/US04/3762 filed on Nov. 11, 2004, herein incorporated by reference in its entirety.

The reformed gas stream exiting the steam reformer 22 is directed through reformed gas conduit 72 into a water condenser 74, where water is condensed and separated from the hydrogen gas.

Figure 2:
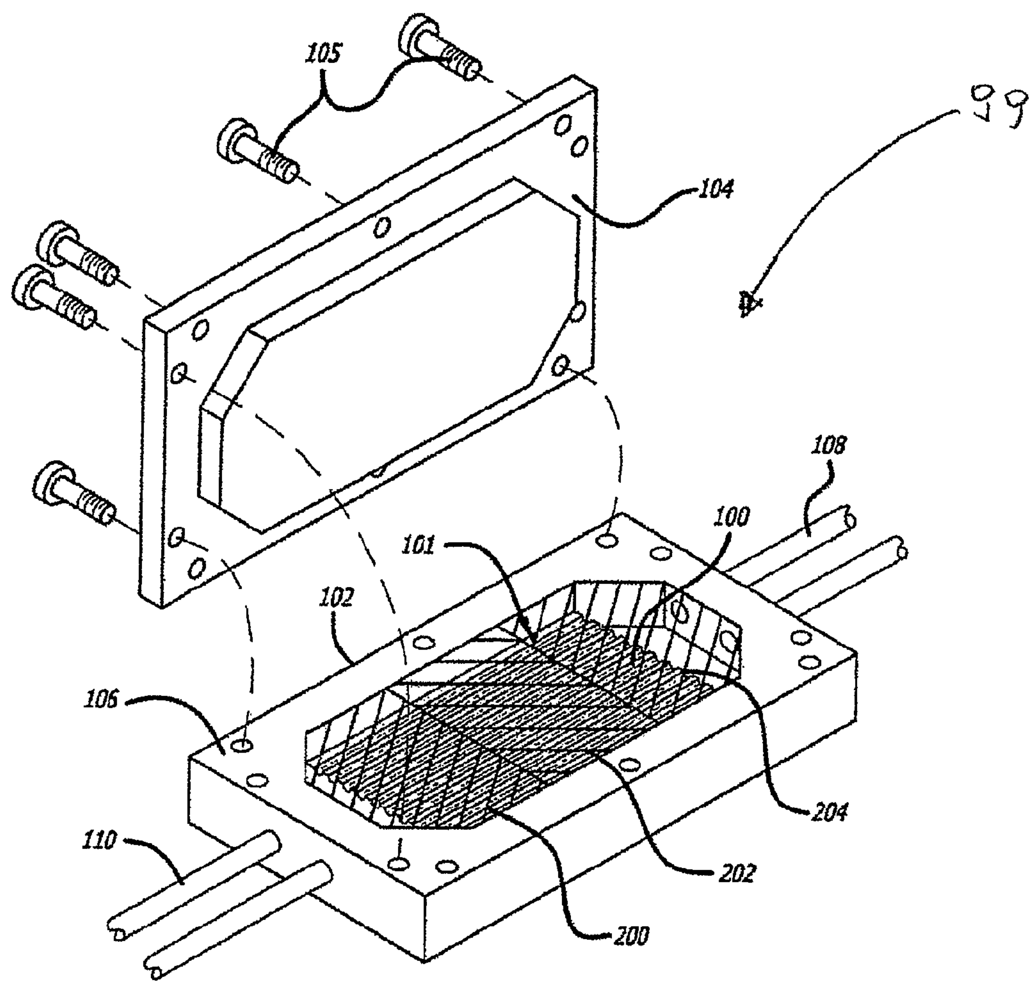
FIG. 2 shows an exemplary hydrogen reactor chamber packed/loaded in accordance with the teachings of the present invention.

FIG. 2 is an exemplary hydrogen reactor chamber 99 containing catalysts loaded in accordance with one aspect of the present disclosure. The hydrogen reactor chamber 99 is also denominated "MesoChannel Reactor" and provides means by which different catalysts can be loaded and tested.

In the MesoChannel Reactor 99, a block 100 is included in a housing 102 which consists of a top cover 104 and a bottom base 106, each containing a knife edge that could cut into a metal gasket, that is preferably nickel or copper, to provide a leak-tight seal. The top cover 104 and the bottom base 106 were assembled using socket head cap screws 105. The bottom base contained a tubing 108 for feeding reactants at one end and a tubing 110 for removing product gases on the opposite end. In the reactor of FIG. 2, tubing 108 are formed by an ⅛" OD stainless steel tubing (SS 316 grade) and tubing 110 are formed be an ⅛" OD stainless steel (SS 316 grade). The block 100 includes channels 101.

Channels 101 as shown in FIG. 2 were machined into a metal block that was 76.2 mm length×37.6 mm width using CNC milling on both sides of a block 100. Preferable materials of construction are stainless steel 304, Inconel 600, and when it is required to decrease the component weight, titanium. Block 100 was then inserted into a housing 102 constructed preferably out of stainless steel (SS 304 grade) as exemplarily shown in FIGS. 3 and 4. While exemplary channels 101 do not have any curves, other configurations of channels 101 can also be provided, such as serpentine or curves, if so desired. An exemplary block 100 having channels 101 can be about 30 g in weight.

Block 100 includes a staged catalyst medium wherein catalysts possessing unique distinctive characteristics are disposed in zones identified with numerals 200 202 and 204. Catalyst loading in zones 200 202 and 204 is accomplished utilizing a plurality of catalyst powders within the hydrogen reactor chamber, wherein each of the plurality of catalyst powders possesses unique definitive characteristics, packed in the reactor such as to provide a staged catalyst medium through which the feed stream of hydrocarbons is passed, to liberate hydrogen.

Exemplary catalysts include high-activity catalysts, coke-resistant steam reformation catalysts and steam reformation catalysts that also promotes a water-gas shift reaction. In one example, although not limited thereto, zones are provided, here for example the three zones 200, 202 and 204, and are packed with the respective catalyst powders or blends thereof, as desired.

The lines used in FIG. 2 to delineate zones 200, 202 and 204 are for demonstration/explanatory purposes and in no way are meant as a limitation of possible configurations/overall geometry of multi-catalyst packing, as described herein. Graded/transitional portions/zones, having mixtures/a blend of catalysts that comprise zones adjacent thereto, can also be provided, such that the fluid flow passes transitional portions disposed between a first provided zone and a second provided zone. For example, the fluid is first exposed to a first catalyst in a first zone, then passes a graded/transitional portion having a mixture of a first catalyst and a second catalyst, then passing through a second zone having the second catalyst.

While three zones are exemplarily depicted in FIG. 2, any number of useful zones may be provided and loaded with catalysts, in accordance with concept of staged configuration disclosed herein.

Figure 3:
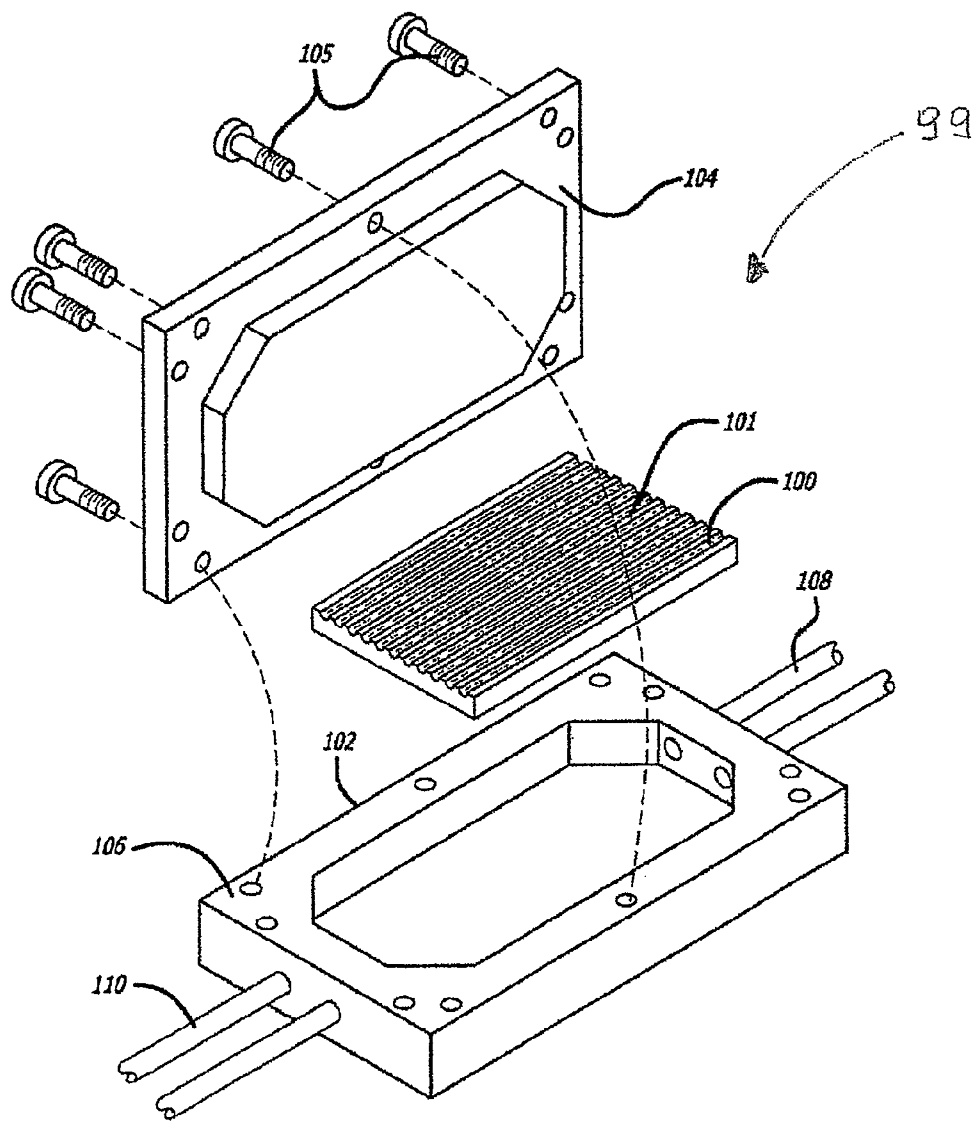
FIG. 3 shows an exemplary hydrogen generating reactor depicting the bottom portion and an exemplary channeled insert made in accordance with the teachings of the present invention.
Figures 4, 5:
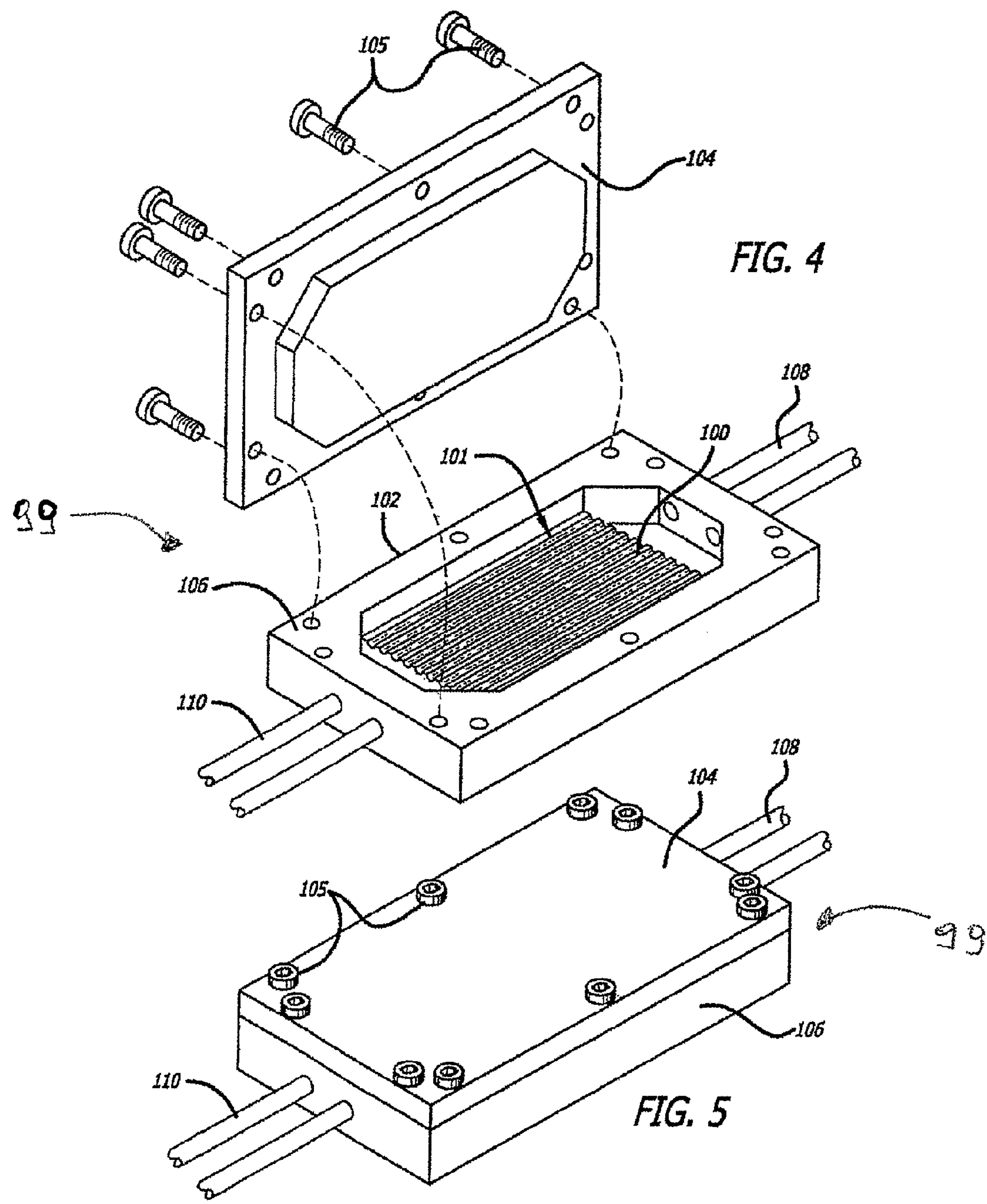
FIG. 4 shows an exemplary hydrogen generating reactor having the exemplary channeled insert in place.
FIG. 5 shows an embodiment of an assembled (covered) exemplary hydrogen generating reactor.

FIGS. 3 to 5 show an exemplary assembly process of the MesoChannel Reactor as shown in FIG. 2.

FIG. 3 depicts exemplary reactor components of hydrogen reactor chamber 99 showing the housing 102, the block 100 containing channels 101, and top cover 104 prior to assembly. The assembly of these reactor components incorporation of catalysts yields an exemplary partially assembled "MesoChannel Reactor".

FIG. 4 depicts exemplary reactor components of hydrogen reactor chamber 99 with block 100 in place. Housing 102 was designed in such a manner so as to provide a leak-tight assembly when tested at pressures of up to 100 psig. The housing 102 consists of a top cover 104 and a bottom base 106, each containing a knife edge that could cut into a metal gasket, that is preferably nickel or copper, to provide a leak-tight seal. When changing catalysts is not required, the top cover 104, the bottom base 106 and the reactor can be sealed using conventional welding or brazing techniques.

FIG. 5 depicts an exemplary assembled MesoChannel reactor. The top cover 104 and the bottom base 106 shown in FIG. 4 were assembled using socket head cap screws 105. The bottom base contained an ⅛" OD stainless steel tubing 108 (SS 316 grade) for feeding reactants in at one end and an ⅛" OD stainless steel tubing 110 (SS 316 grade) for removing product gases on the opposite end. In this embodiment, each end of the base also had provisions to accommodate 1/16" OD thermocouples. In one embodiment, the volume of this exemplary reactor with a titanium insert in place was measured to be 10 cc.

The MesoChannel Reactor is one of the hydrogen generating reaction chambers also suitable for steam reformation of hydrocarbon fuel. In some exemplary implementations, the MesoChannel Reactor can be included as a steam reformer 22 in a hydrogen generating apparatus such as hydrogen generating apparatus 10 depicted in FIG. 1. In other exemplary implementations, the steam reformer 22 is constituted by a hydrogen membrane reactor including a hydrogen separation membrane.

Steam reforming of hydrocarbons in the $C_1$-$C_4$ range is described in the non-limiting examples below. In these examples, the reformer temperature was intentionally held below 625° C., and more preferably at about 575° C. Operating at these temperature offers the following advantage, namely, enhancing the stability of the hydrogen separation membrane when the hydrogen generator is operated as a membrane steam reformer, since a temperature of 575° C. is below the Tamman temperature range (the range at which bulk atoms exhibit mobility), and hence inter-metallic diffusion problems are avoided.

In an exemplary implementation, the hydrogen separation membrane is preferably a film of palladium alloy and is more preferably a film of a palladium-silver alloy (77% Pd) on a porous support. Preferred porous supports include stainless steel and Inconel available from Mott Corp. As stated above, the steam reformation reaction is preferably carried at a temperature in the range of about below 625° C. more preferably below 575° C. Another advantage is that reforming at these temperatures results in the presence of un-reacted hydrocarbons in outlet gas, which is preferably in the 5 to 25 mole % range. These un-reacted hydrocarbons are combusted to provide heat to vaporize water and preheat the feed, and to run the reforming reaction as described in PCT/US02/12822, filed Apr. 23, 2002, which is herein incorporated by reference. In particular exemplary implementations, such outlet gas comprising partially reformed hydrocarbons can be fed to a solid oxide fuel cell (SOFC) to complete the reformation process. Finally, operating below 625° C., permits the use of conventional and relatively inexpensive metals such as stainless steel, as materials of construction.

Inconel is available from a variety of sources, as known in the art, and is a variety of alloys which are useful for practicing the present invention. Exemplary alloys include, but are not limited to: Inconel 600 (nominal composition of essential elements: Ni(+Co) 76.4, C 0.04, Mn 0.2, Fe 7.2, S 0.007, Si 0.2, Cu 0.10, Cr 15.85); Inconel 625 (nominal composition of essential elements: Ni (+Co) 62.6 C 0.05, Mn 0.55, Fe 6.85, S 0.007, Si 0.35, Cu 0.05, Cr 20, Al 0.15, Ti 0.3, Cb(+Ta) 3.95; Inconel X (nominal composition of essential elements: Ni (+Co) 72.85, C 0.04, Mn 0.65, Fe 6.80, S 0.007, Si 0.3, Cu 0.05, Cr 15.15 Al 0.75, Ti 2.5, Cb (+Ta) 0.85).

In an exemplary implementation, the steam reformer 22 incorporates a highly effective combination of three catalysts to transform a feed stream containing a C1-C4 hydrocarbon or mixtures of such hydrocarbons into hydrogen, while substantially eliminating the formation of coke residue.

The first catalyst is a high-activity steam reformation catalyst. Exemplary high activity steam reformation catalysts typically have light-off temperatures in about the 350-400° C. range. Preferred high-activity steam reformation catalysts include supported, nickel-based catalysts, such as the C 11-9-09 catalyst available from Süd Chemie, Louisville, Ky. The C 11-9-09 catalyst is formed of 1-15 wt. % nickel oxide on an alumina support.

The second catalyst is a coke-resistant steam reformation catalyst. Preferred coke-resistant catalysts include supported, doped, nickel-based catalysts. Representative dopants include calcium oxide, potassium oxide, calcium aluminate and combinations thereof. Suitable coke-resistant catalysts include G-91 catalyst also available from Süd Chemie. The G-91 catalyst is formed of 15-25 wt. % nickel 150° C. for 1 h, ramping to 700° C. at a ramp rate of 180° C./h and holding at 700° C. for 4 h.

The relative amount of each catalyst will depend on a number of operating parameters including the particular steam reformation reactor and feed gas. For example, the relative concentration of the high activity catalyst can be increased with increasing proportion of C1 or natural gas in the feedstock, while the relative concentration of the coke-resistant catalyst can be increased with the increasing proportion of higher hydrocarbons in the feedstock. Typically, the catalysts are loaded into the steam reformer 22 in such a manner that the steam reformer reactor contains from about 10 wt. % to 70 wt. %, preferably about 20 wt. % to 60 wt. %, and more preferably about 51 wt. % of the first catalyst, about 10 wt. % to 70 wt. %, preferably about 20 wt. % to 60 wt. %, and more preferably about 46 wt. % of the second catalyst, and about 1 wt. % to 10 wt. %, preferably about 2 wt. % to 5 wt. %, and more preferably about 3 wt. % of the third catalyst.

In exemplary implementations where a premium is placed on minimizing the production of coke, the coke-resistant catalyst is loaded at the entrance of the steam reformer 22, followed by the high-activity catalyst. In exemplary implementations where it is desired to enhance catalyst activity, all or part of the coke-resistant catalyst can be mixed with the high-activity catalyst, before loading into the steam reformer. The third catalyst is incorporated at adjacent the exit portion. In the case of catalysts provided as powders, the powders are packed manually, that is powders, shake/tap to allow powders to settle, fill more powders etc, until the channels 101 are fully packed. The reactor is then sealed, a gas is passed through the reactor, the reactor is opened for inspection and channels 101 are repacked if needed.

When catalysts are in the form of powders, the catalyst powders are carefully packed so as to prevent the occurrence of channeling. Channeling occurs when catalyst particles are dislodged so as to expose catalyst-free pathways that offer a path of least resistance which gases will take, and therefore result in lower hydrogen production rates.

EXAMPLES

In the illustrative examples below, the effective hydrocarbon conversion ($X_{HC}$) is defined as follows: oxide, 1-10 wt. % calcium oxide, 1-5 wt. % potassium oxide, and 20-49 wt. % calcium aluminate on an alumina support.

In preferred embodiments, the activity of the supported, nickel-based catalyst is increased by including small amounts of a noble metals. In some preferred embodiments, the catalysts contain from about 1-2 wt. %, more preferably from about 0.5-1 wt. % of noble metals such as platinum, palladium and rhodium, for example.

The third catalyst is a steam reformation catalyst that also promotes a water-gas shift reaction. The water-gas shift reaction is a reaction that causes water to further react with the CO produced in accordance with Equation (1), above. This not only results in the production of additional hydrogen, but it reduces the amount of CO, an undesirable byproduct of steam reformation. The water-gas shift reaction can be represented by the following equation:

$$CO+H_2O \rightarrow CO_2+H_2 \quad \text{Equation (3)}$$

Suitable third catalysts are supported catalysts containing 1-3 wt. %, preferably about 0.5 wt. % to 2 wt. %, noble metal, such as platinum and/or palladium on a high surface area support. In the case of platinum or palladium, these catalysts can be prepared from dihydrogen hexachloroplatinate (IV) and tetraamine palladium (II) nitrate (both from Alfa Aesar) using an incipient wetness technique, for example.

Representative supports include high surface area alumina, silica, zirconia or ceria supports, more preferably supports doped with calcia or magnesia. The latter doped supports are less acidic, and are therefore less susceptible to coke formation. A preferred high surface support contains, in weight percent (wt. %), >92 wt. % alumina, 1 wt. %, to 10 wt. % calcium oxide more preferably 1 to 5 wt. % calcium oxide and 0.5 wt. % to 5 wt. % magnesium oxide, and more preferably 0.5 wt. % to 2 wt. %, magnesium oxide. Such catalyst supports are available from Saint Gobain Norpro.

The supports, typically having an initial surface area on the order of 250 $m^2/g$, are sized mesh, preferably about 35 to 60 mesh (250 to 500 micron sized particles) prior to impregnation with the noble metal catalyst. After impregnation, the resulting supported catalyst powders are heat treated, for example heat treated at $X_{HC}=(C_{CO+CO2})/(C_{in})$, where C represents carbon

Example 1

Hydrogen Production Using a Plurality of Catalysts

Hydrogen production from methane using a plurality of catalysts containing 46% of the coke resistant catalyst, 51% of the high activity catalyst and 3% of the steam reformation catalyst with water gas shift capabilities. The same catalyst loading was used for all examples.

Hydrogen is produced from methane via the following reactions:

$$CH_4+H_2O \rightarrow CO+3H_2 \quad (1)$$

$$CO+H_2O \rightarrow CO_2+H_2 \quad (2)$$

Reaction (1) is referred to as steam reforming and reaction (2) is generally referred to as the water gas shift reaction. A combination of reactions (1) and (2) yields $$CH_4+2H_2O \rightarrow CO_2+4H_2 \quad (4)$$

Reaction (4) shows that the stoichiometric steam to carbon ratio (S/C) is 2. To prevent coke accumulation and promote water gas shift, an excess of steam preferably equal to 1.5 times the stoichiometric value was employed. The S/C ratio was therefore close to 3. The residence time based on reactor volume was calculated to be 0.31 to 0.34 s. Residence time is defined as the ratio of the reactor volume to the flow rate of the reactants (steam+methane) at reaction temperature at pressure. The inverse of the residence time is defined as the space velocity. This quantity corresponding to residence times of 0.31 to 0.34 s is in the 10,800 h' to 11,500 h' range.

Figure 6:
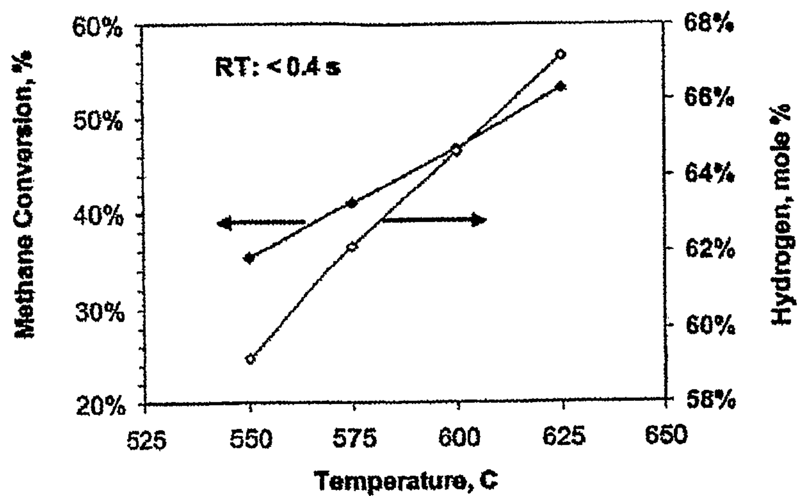
FIG. 6 shows a diagram illustrating an exemplary methane conversion and hydrogen concentration in function of the temperature during steam reformation in an exemplary hydrogen generation reactor; on the y axes the methane conversion percentage and the hydrogen mole percentages are reported; on the x axis the temperature is reported.

Methane conversion and hydrogen concentration in the dry product gas during steam reformation of methane at residence times less than 0.4 s were measured in an exemplary MesoChannel Reactor. The results are shown in FIG. 6, which is an exemplary plot of methane conversion and hydrogen concentration in the product gas (dry basis) as a function of temperature at a residence time of less than 0.31 to 0.34 s. As can be seen, both of these quantities increased with temperature in a monotonic fashion resulting conversions of 53% and hydrogen concentrations of 68% at 625° C. Carbon balance calculated as (g $C_{in}$−g $C_{out}$)/g $C_{in}$ for each analysis was within +/−3% over the course of this run.

Figure 7:
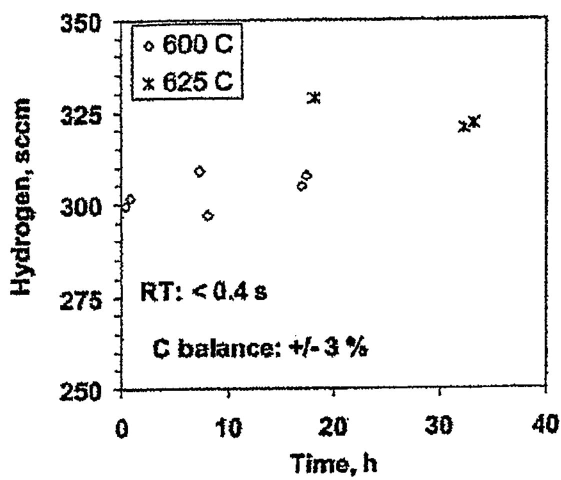
FIG. 7 shows a diagram illustrating exemplary hydrogen production rates during steam reformation of methane in an exemplary hydrogen generation reactor; on the y axes the hydrogen flow in standard centimeter cube per minute are reported; on the x axis the temperature is reported.

Hydrogen production rates during steam reformation of methane at residence times less than 0.4 s were also measured and the results are shown in FIG. 7 which reports a diagram illustrating the hydrogen production rates during the reaction temperatures of 600° C. and 625° C. As shown in FIG. 7 a hydrogen production rate of about 300 sccm (flow rate at STP) was sustained for more than 30 hours. This result points to excellent catalyst stability under the reaction conditions employed. The up-stream reaction pressure during these measurements varied from 1.7 to 2.8 psig. Operating at such low pressures while at space velocities of >10,000 $h^{-1}$ and with catalyst powders is made possible using the MesoChannel reactor architecture described above.

Figure 8:
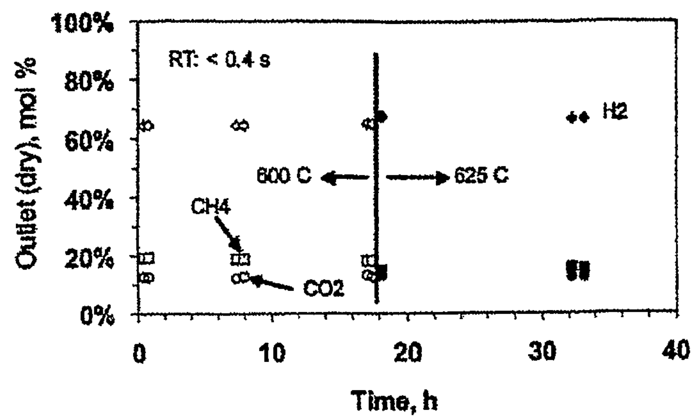
FIG. 8 shows a diagram illustrating exemplary hydrogen ($H_2$— black squares), carbon dioxide ($CO_2$— white squares) and methane ($CH_4$ white circles) concentrations in an exemplary hydrogen generation reactor; on the y axis the concentration as mol % is reported; on the x axis the time is reported.
Figure 9:
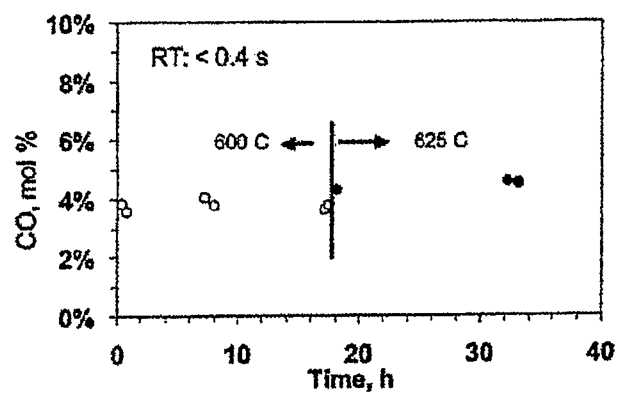
FIG. 9 shows a diagram illustrating exemplary carbon monoxide concentrations in the dry product gas during steam reformation of methane in an exemplary hydrogen generation reactor; on the y axis the concentration as mol % is reported; on the x axis the time is reported.

Carbon dioxide, carbon monoxide and methane concentrations in the dry product gas during steam reformation of methane at residence times less than 0.4 s was also measured in the MesoChannel Reactor and the results are shown in FIGS. 8 and 9. FIG. 8 shows the concentrations of hydrogen, carbon dioxide and methane while FIG. 9 shows the carbon monoxide levels in the reactor effluent gas (dry basis). The flat trends seen in these figures also support excellent stability. Notice in particular (FIG. 9) that the concentration of CO is only about 4% at both 600° C. and 625° C. Such low levels of CO indicates that the water gas shift reaction (reaction 2) is favored due to the addition of excess steam in the feed and due to the selection and configuration of proper catalysts.

Figure 10:
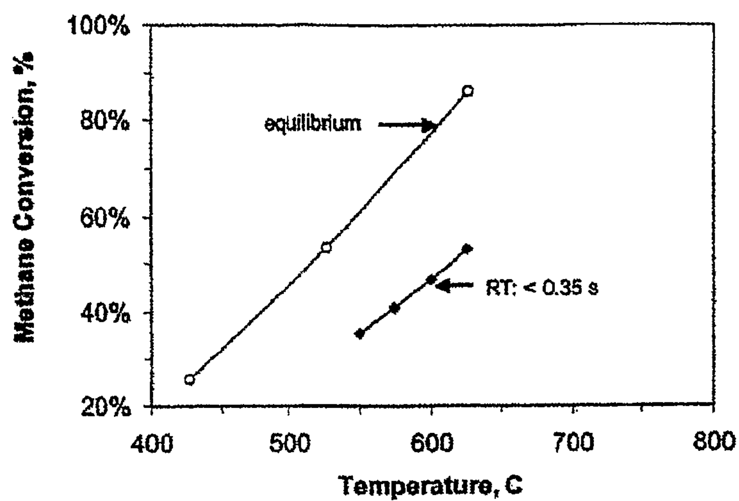
FIG. 10 shows a diagram illustrating a comparison equilibrium methane conversion vs. experimental values, in an exemplary hydrogen generation reactor; on the y axis the methane conversion concentration as mol % is reported; on the x axis the temperature is reported.

Experiments were also carried out to measure equilibrium methane conversion vs. experimental values in the MesoChannel Reactor. The experimental results were obtained during steam reformation of methane at residence times less than 0.4 s and are shown in FIG. 10, wherein a comparison of equilibrium methane conversions and measured methane conversions is shown. The equilibrium compositions were calculated by minimizing the Gibbs free energy of a mixture consisting of methane, carbon oxide, carbon dioxide, hydrogen and water and at the same pressure and S/C ratio as that corresponding to the experimental run.

Figure 11:
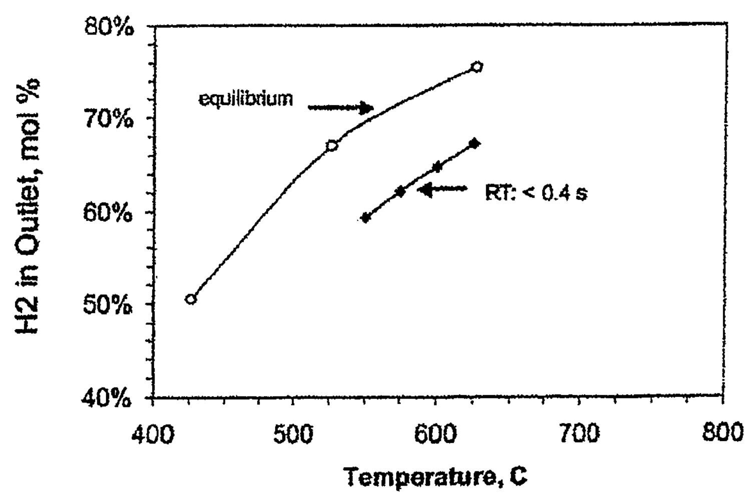
FIG. 11 shows a diagram illustrating an equilibrium hydrogen concentrations vs. experimental values in an exemplary hydrogen generation reactor; on the y axis the concentration as mol % is reported; on the x axis the temperature is reported.

The equilibrium hydrogen concentrations vs. experimental values on a dry basis, during steam reformation of the methane shown in FIG. 10 was also measured. The results are reported on FIG. 11, which shows a comparison of equilibrium and experimental hydrogen concentrations dry basis vs. experimental values and indicates that the operating conditions are away from equilibrium, and therefore suggests that higher hydrogen production rates (>300 sccm) are possible as conditions are chosen to approach equilibrium using the same reactor.

The reaction was stopped by gradually replacing methane flow with hydrogen flow, while reducing the temperature. Water was cut-off when the reactor temperature reached about 350° C. and the reactor was cooled to room temperature under hydrogen flow. On reaching room temperature, hydrogen flow was cut-off and the reactor was idled.

Example 2

Hydrogen Production by the Steam Reforming of Methane after Reactor Idling for more than 2 Months The reactor with the same catalyst loading was again heated to repeat methane steam reforming as described in Example 1, after an idling time of more than 2 months a period during which the reactor remains at room temperature with no gas flow is referred to as idling. The start-up procedure as described in Example I was followed. Table I compares conversions (X) and outlet gas compositions obtained at 550° C. and 575° C. during this run with the values obtained during the run described Exampe 1, in mole fraction, dry basis. As can be seen, there is good agreement between the two runs, pointing to good catalyst stability, during one thermal cycle. The thermal cycle consisted of cooling from 625° C. to room temperature at the end of the run described in Example 1, and heating from room temperature to 550° C. and then to 575° C. during the start-up of the run in Example 2.

TABLE 1

| Run | Temp (° C.) | X, $CH_4$ | $H_2$ | CO | $CH_4$ | $CO_2$ |
|---|---|---|---|---|---|---|
| Example 1 | 550 | 35.44 | 59.17 | 1.74 | 26.36 | 12.73 |
| | 575 | 41.07 | 62.13 | 2.55 | 22.32 | 13.00 |
| Example 2 | 550 | 40.87 | 57.29 | 2.24 | 27.31 | 13.15 |
| | 575 | 45.58 | 62.45 | 3.16 | 20.43 | 13.95 |

Example 3

Hydrogen Production by the Steam Reforming of Propane

The reactor that was in operation for methane reforming as described in Example 2, was then utilized for propane reforming by simply replacing methane flow by propane flow while the reactor temperature was at 575° C. The propane used was of a certified purity grade (99.98%, Matheson). Minor constituents that were present in the propane gas feed are listed in Table 2. No attempt was made to remove the sulfur that was present in the propane feed.

TABLE 2

| | Impurity | Concentration (ppm) |
|---|---|---|
| 1. | n-butane | 0.4 |
| 2. | Ethane | 1.4 |
| 3. | Ethylene | <0.5 |
| 4. | Isobutane | 0.4 |
| 5. | Methane | <0.5 |
| 6. | Nitrogen | 1.8 |
| 7. | Oxygen | <0.5 |
| 8. | Propylene | <0.5 |
| 9. | Sulfur | <0.5 |
| 10. | Water | <1 |

The flow rate of propane and steam was controlled to yield a feed SIC ratio of 2.86, which is close to the S/C value of 3 that was used for methane reforming as described in Example 1. The residence time at reaction temperature and pressure was 0.24 seconds, and the reactor pressure was in the 2-3 psig range.

Figure 12A:
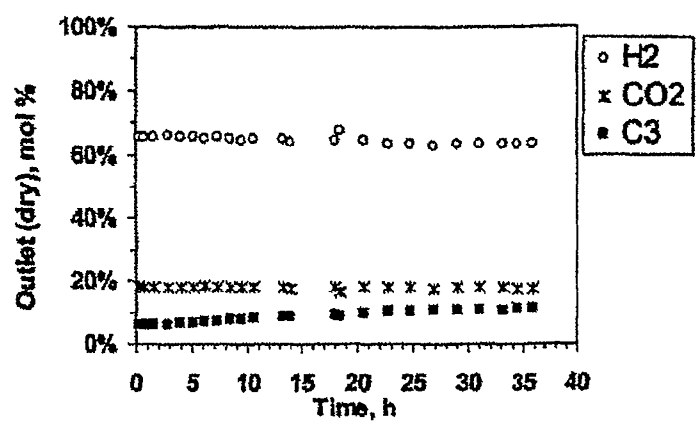
FIG. 12A shows a diagram illustrating production of $H_2$, $CO_2$ and propane in an exemplary hydrogen generation reactor, during a "hot swap" of fuels; on the y axis the concentration as mol % is reported; on the x axis the time is reported.
Figure 12B:
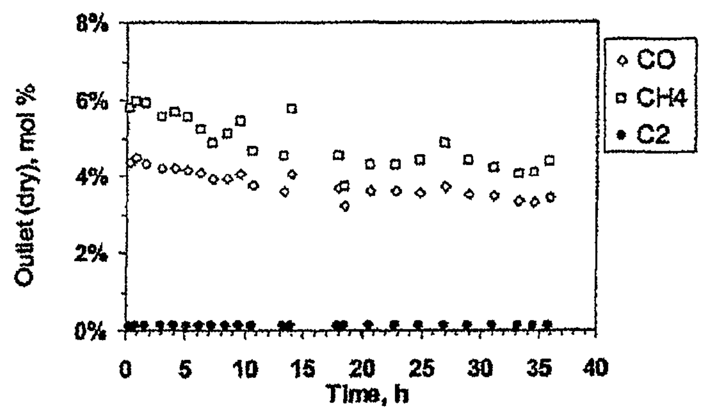
FIG. 12B shows a diagram illustrating production of CO, $CH_4$ and $C_2$ in an exemplary hydrogen generation reactor, during a "hot swap" of fuels; on the y axis the concentration as mol % is reported; on the x axis the time is reported.

The composition of the outlet gas was monitored continuously for about 35 hours and was found to be as shown in FIGS. 12A and 12B. The hydrogen content of the product gas was about 64% ($H_2$, equilibrium 66%) and remained fairly steady during this period. The CO and $CO_2$ contents were about 4% (CO, equilibrium=7%) and about 18% ($CO_2$, equilibrium=17%) respectively, indicating the occurrence of the water gas shift reaction. Average hydrocarbon conversion was 41% (equilibrium conversion=70%), and reformed gas production was at the rate of about 326 sccm.

Example 4

Hydrogen Production by the Steam Reforming of Butane

The reactor that was in operation for propane steam reforming as described in Example 3, was then utilized for producing hydrogen via the steam reforming of butane by simply replacing the propane flow with butane flow, while the reactor temperature was at 575° C. The butane that was used was commercial purity grade (99%, Matheson) and was stored as a liquid under 150 psig nitrogen head pressure. No attempt was made to pre-treat the butane feed prior to feeding into the reactor. The flow rate of butane and steam was controlled to yield a feed with a S/C ratio of 2.87. The residence time at reaction temperature and pressure was about 0.26 seconds.

Figure 13:
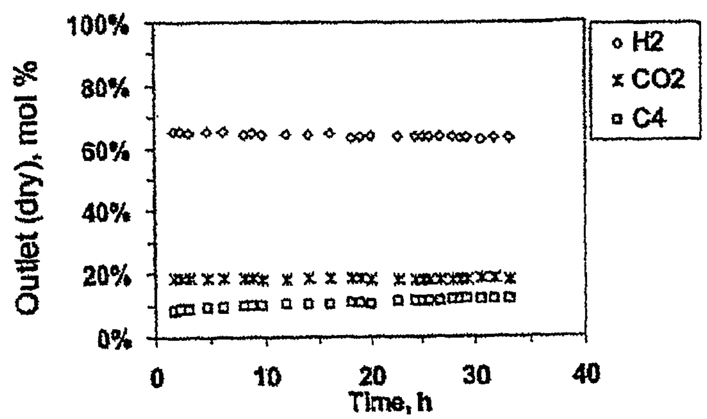
FIG. 13A shows a diagram illustrating production $H_2$, $CO_2$ and $C_4$ (butane) in an exemplary hydrogen generation reactor, during a "hot swap" of fuels; on the y axis the concentration as mol % is reported; on the x axis the time is reported.
FIG. 13B shows a diagram illustrating production CO, $CH_4$ and $C_2$ and $C_3$ in an exemplary hydrogen generation reactor, during a "hot swap" of fuels; on the y axis the concentration as mol % is reported; on the x axis the time is reported.
Figure 13:
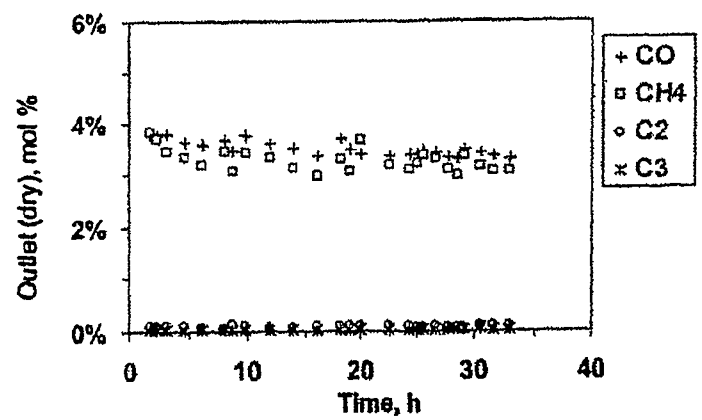

The composition of the reactor outlet gas was monitored continuously for a period of about 33 hours and was found to be as presented in FIGS. 13A and 13B. It can be seen that the hydrogen content in the product gas remained fairly steady at about 64% ($H_2$, equilibrium=65.5%) during this period, while the CO content remained at under 4% (CO. equilibrium=7%). The average hydrocarbon conversion over the 33 hour testing period was about 32% (equilibrium conversion 72.5%), while reformed gas was produced at the rate of about 335 sccm.

Figure 14:
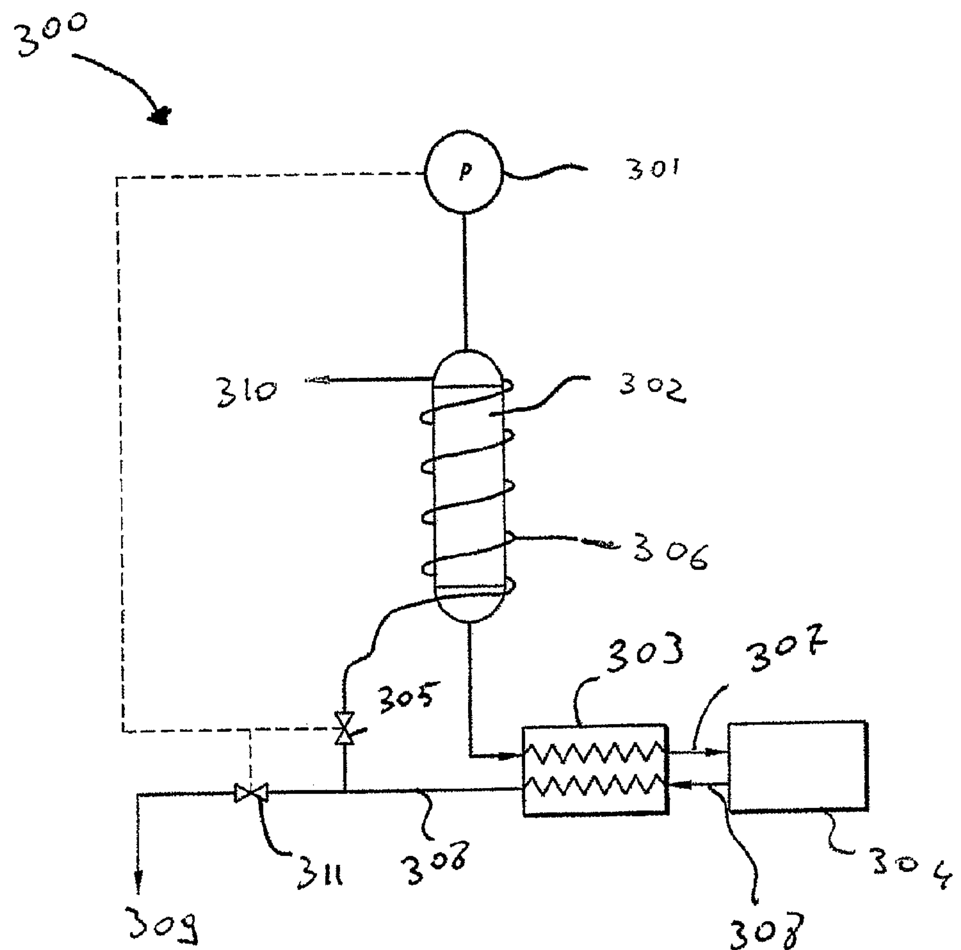
FIG. 14 is a schematic diagram of an exemplary apparatus for vaporizing butane prior to feeding butane into an exemplary hydrogen generator of FIG. 5.

As mentioned above, butane was stored as a liquid and was vaporized using an exemplary vaporizer system 300 as shown in FIG. 14.

The vaporizer system 300 comprises a butane storage 302 connected with a pressure sensor 301, and with a reactor 304 through a heat exchanger 303. The butane is fed into the reactor 304 through the conduit 307 and the product gases exiting reactor 304 are directed to an exhaust 309 through conduit 308. Conduit 308 originates heat exchange coils 306 wrapping around butane storage 302 and directed to an exhaust 310. A first detector 305 in the conduit 306 and a second detector in the conduit 308 are provided and associated to pressure sensor 301 to detect pressure in the various portions of the system.

Such an arrangement was adopted to circumvent flow fluctuations that would arise due to a vapor/liquid flow of butane. The temperature of the heating bath was maintained at about 44° C. Butane that was stored as a liquid was metered through a needle valve into an intermediate storage vessel that was provided with a coil of copper tubing that was wound around it. Water from a constant temperature bath was circulated through the coil in order to provide heat. Butane from the intermediate storage vessel was routed through a back pressure regulator and through a coil of copper tubing that was immersed in the constant temperature bath and then to a mass flow controller. In a hydrogen generation apparatus as shown in FIG. 1, butane can be warmed by utilizing the heat from hot streams such the combustion exhaust gases exiting the combustors, for example stream 54 that exits the vaporizer.

When liquid butane is used for producing hydrogen for portable fuel cell applications, a process flow arrangement, as exemplarily depicted schematically in FIG. 14, can be used to insure a well regulated flow of butane into the reactor. Such an arrangement can be particularly beneficial when the reactor is of the form of a hydrogen-separating membrane reactor, which typically operates at pressures in the 40 to 60 psig range to insure sufficient hydrogen flow through the membrane. At 20° C., butane has a vapor pressure of only 15 psig, but at 50° C., butane has a vapor pressure of 58 psig, which is sufficient to meet the needs of a membrane reactor.

Example 5

Hydrogen Production by the Steam Reforming of Coleman Powermax Fuel

Fuels that are available in canisters, such as the Powermax fuel which is sold by the Coleman Company (Wichita, Kans.), are widely used during the pursuit of outdoor activities to power portable devices such as stoves. The Powermax fuel is made up of approximately 60% butane and 40% propane. It is inexpensive and is stored in lightweight canisters. The fuel has a higher vapor pressure than pure butane due to the propane blend, and is well suited for operation at colder temperatures. These fuels typically contain sulfur additives such as light mercaptans and with a total sulfur content usually in the about 15 to 25 ppm range.

The reactor that was in operation for steam reforming of butane, as described in Example 4, was then utilized for producing hydrogen via the steam reforming of the Powermax fuel by simply replacing the propane flow with Powermax fuel flow, while the reactor temperature was at 575° C. In this case, however, the fuel was routed through an adsorber (bed as described above) to remove sulfur. Adsorbents that are commonly used for sulfur removal include activated charcoal, molecular sieves and zinc oxide. More preferably, the adsorbent is an activated carbon that contains transition metals like copper and iron. Such adsorbents are cheap, efficient and are regenerable, unlike the zinc oxides. The adsorbent utilized here was composed of 90-100 wt.-% activated carbon, 0-10 wt.-% ferric oxide and 0-10 wt.-% cupric oxide. The adsorbent was supplied by Nucon International (Columbus, Ohio), and is capable of removing $H_2S$, $CS_2$, light mercaptans, t-butyl mercpatans, sulfides, disulfides and hydrogen selenide with adsorption capacities of 15 wt.-% sulfur. The adsorbents particles were in the form of extrudates that were 0.056 inch in diameter and 0.1 inch in length.

The adsorber bed was a 1.5 inch ID (internal diameter)×12 inch tube that was packed with 175 g of the adsorbent. If the fuel flow rate is so chosen to correspond to a hydrogen production of about 200 sccm, and assuming that the fuel contains 50 ppm of light sulfur compounds, the loading of 175 g of this adsorbent should be capable of removing sulfur for more than 5 years of continuous operation. The adsorbent bed can be sized in such a manner to meet the requirements of hydrogen generation for stationary or portable fuel cell applications.

The adsorbent bed used in this example resulted in a L/Dp (length to particle diameter) ratio of about 210 and D/Dp (diameter of tube to particle diameter) of 27. Desired values of these ratios are about 50 to 100 and about 5 to 10, respectively, to insure uniform plug flow behavior.

The control valve of the fuel canister was adapted to incorporate a ⅛" stainless tubing that contained a needle valve. Fuel was routed through a needle valve into the adsorber. The outlet stream of the adsorber passed through a vaporizing coil that was maintained at about 44° C., and was metered using a mass flow controller into the reactor system. The flow rate of the fuel and steam was controlled to yield a feed with a S/C ratio of 2.26. The residence time at reaction temperature and pressure was about 0.25 seconds.

Figure 15:
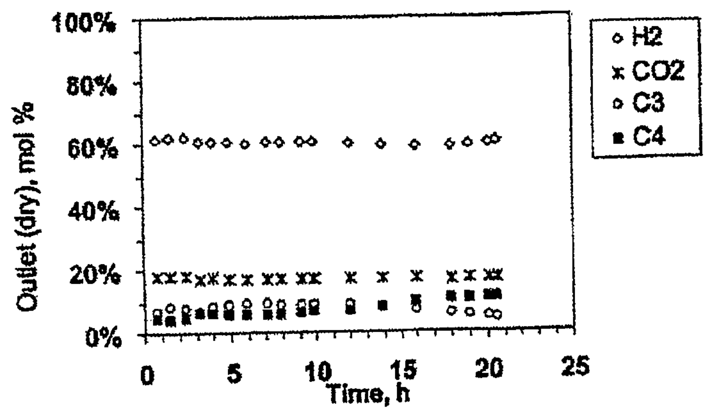
FIG. 15A shows a diagram illustrating production of $H_2$, $CO_2$ and $C_3$ and $C_4$ (butane) in an exemplary hydrogen generation reactor, during a "hot swap" of fuels; on the y axis the concentration as mol % is reported; on the x axis the time is reported.
FIG. 15B shows a diagram illustrating production of CO, $CH_4$ and $C_2$ in an exemplary hydrogen generation reactor, during a "hot swap" of fuels; on the y axis the concentration as mol % is reported; on the x axis the time is reported.
Figure 15B:
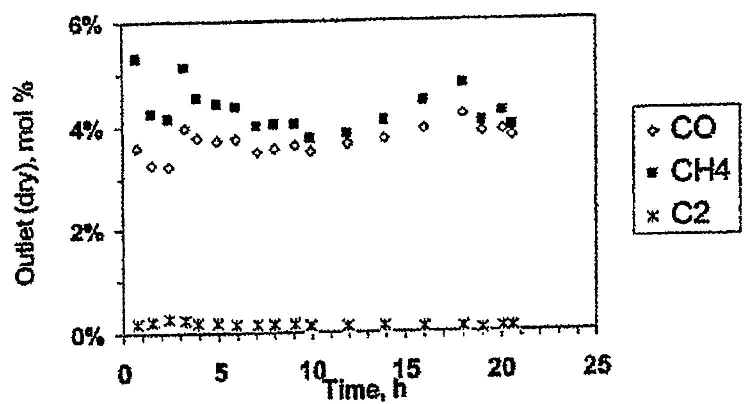

The composition of the reactor outlet gas was monitored continuously for a period of about 20 hours and was found to be as shown in FIGS. 15A and 15B. It can be seen from FIG. 15A that the hydrogen content in the product gas remained fairly steady at about 60% ($H_2$ at equilibrium=64%) during this period, while the CO content remained at about 4% (CO content at equilibrium 7%). The average hydrocarbon conversion was about 31% (equilibrium conversion=67.5%), while reformed gas was produced at the rate of about 345 sccm over a 20 hour testing period.

Example 6

Steam Reforming of Propane: Long Term Stability Test

As demonstrated in examples 1 to 5, hydrogen was produced by successively switching or "hot swapping" to different hydrocarbons: from methane for about 33 h, to propane for about 35 hours, to butane for about 33 hours and to Powermax fuel for about 20 hours. To further demonstrate that the same catalyst possesses the ability to reform various hydrocarbons to hydrogen, another test was conducted for a period that was in excess of 240 h and is described below.

The reactor that was in operation for Powermax fuel reforming as described in Example 5, was then utilized for propane reforming by simply replacing Powermax fuel flow by propane flow while the reactor temperature was at 575° C. The propane used was of the certified purity grade (99.98%, Matheson) and was the same fuel as used in Example 2.

The flow rate of propane and steam was controlled to yield a feed with a S/C ratio of 2.55 (=2.86 in Example 3). The residence time at reaction temperature and pressure was 0.20 seconds (=0.24 in Example 3), and the reactor pressure was in the 2-3 psig range.

Figure 16A:
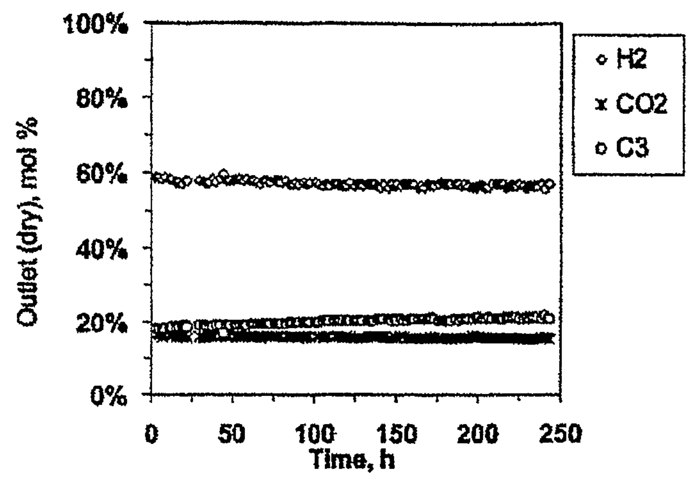
FIG. 16A shows a diagram illustrating production of $H_2$, $CO_2$ and $C_3$ in an exemplary hydrogen generation reactor, during a "hot swap" of fuels; on the y axis the concentration as mol % is reported; on the x axis the time is reported.
Figure 16B:
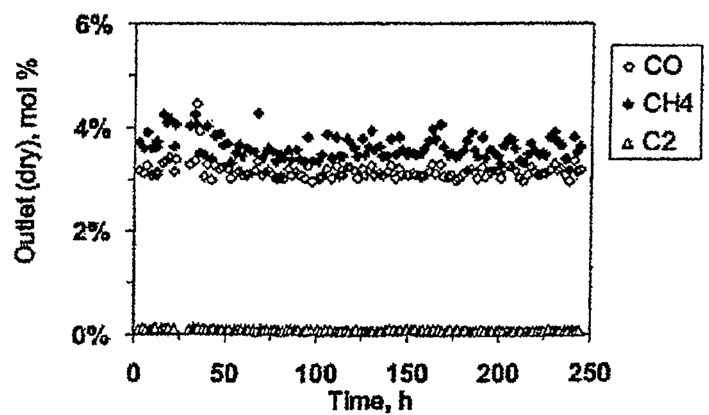
FIG. 16B shows a diagram illustrating production of CO, $CH_4$ and $C_2$ in an exemplary hydrogen generation reactor, during a "hot swap" of fuels; on the y axis the concentration as mol % is reported; on the x axis the time is reported.

The composition of the outlet gas was monitored continuously for more than 240 h hours and was found to be as shown in FIGS. 16A and 16B. The hydrogen content (FIG. 16A) of the product gas was between 56 to 59% ($H_2$ at equilibrium=64%) and remained fairly steady during this period. The CO and $CO_2$ contents were about 4% (CO at equilibrium=7%) and about 16% ($CO_2$ at equilibrium=17%) respectively. The average propane conversion was calculated to be about 30% (equilibrium conversion=67.5%), while reformed gas was produced at about 320 sccm over this period.

Generally, reformed gas contains, on average, about 60 to 75 wt. % hydrogen, 10 to 15 wt. % carbon dioxide, up to 10 wt. % carbon monoxide and 15 to 30 wt. % unreacted fuel. When pure hydrogen is needed, for example for PEM fuel cell applications, the hydrogen is separated from the other gases by, for example, use of a hydrogen membrane reactor. In some exemplary implementations, the unreacted fuel is then recycled to provide at least a portion of the fuel for the combustors integrated with the vaporizer 18, the preheater 20 and/or the steam reformer 22. For generating power using solid oxide fuel cells, the dry reformed stream can be directly routed to the solid oxide fuel cell.

For exemplary implementations in which a fuel cell is added to the system to generate electricity from the hydrogen produced, the preferred fuel cell is a PEM fuel cell. The hydrogen produced can be routed to other hydrogen using apparatus, such as welding and other metal working apparatus.

When pure hydrogen is required, preferably, the hydrogen generator 10 will generate hydrogen on demand and in those exemplary implementations where the hydrogen is to be used immediately after it is generated a hydrogen reservoir is not required. However, there are inefficiencies inherent in a hydrogen generating cycle that comprises a series of short periods of operation followed by long periods of inactivity, because during the start up phase, the fuel is being used to bring the system up to an operating temperature rather than for generating hydrogen. Therefore, in some exemplary implementations, a hydrogen reservoir (not shown) is employed to store hydrogen not currently required, so that while the system is at operating temperature, the fuel can be employed to generate hydrogen for later use, rather than to bring the system to operating temperature. Since the filling of such hydrogen reservoirs, such as hydrides, requires that hydrogen be supplied at pressure, typically between 100 and 300 psig, a compressor should be used to increase the pressure of hydrogen that is diverted to the storage device. Alternately, the operating pressure of the reformer can be increased to suit the pressure requirements of charging the hydrides.

In summary, a method for generating hydrogen, which comprises providing a hydrogen reactor chamber; and providing a plurality of catalysts within said hydrogen reactor chamber, in a staged catalyst medium; a method to generate hydrogen by steam reformation of a hydrocarbon fuel comprising providing a steam reformer and providing a plurality of catalysts within said steam reformer, in a staged catalyst medium; a hydrogen generation apparatus comprising at least one of a steam reformer and a reaction chamber comprising a plurality of catalysts in a staged catalyst medium; a method for manufacturing a hydrogen generation apparatus, comprising: providing a reaction chamber and/or a steam reformer; and providing within said element a plurality of catalysts in a staged catalyst medium.

Although the present invention has been described in connection with the preferred form of practicing it, those of ordinary skill in the art will understand that many modifications can be made thereto without departing from the spirit of the present invention. Accordingly, it is not intended that the scope of the invention in any way be limited by the above description.

The invention claimed is:

1. A hydrogen generating apparatus wherein hydrogen is generated by steam reformation of a hydrocarbon fuel, the apparatus comprising:

a single hydrogen reactor chamber with mesoscale channels having a height and/or width between 0.01 and 0.5 mm;

a series of zones within the mesoscale channels each containing one of a high-activity steam reformation catalyst, a coke-resistant steam reformation catalyst and a steam reformation catalyst which promotes a water-gas shift reaction forming a staged configuration each zone being in physical contact with at least one other zone;

a reactant stream;

an input tube for feeding the reactant stream in fluid communication with a first zone in the reactor chamber; and an output tube for removing product gases in fluid communication with the last sequential zone in the reactor chamber;

whereby all the reactant stream is passed from the input tube into the first zone then said reactant stream passes to the next zones before exiting the reactor chamber from the last zone via the output tube.

2. The hydrogen generating apparatus of claim 1, wherein the coke-resistant steam reformation catalyst is loaded at an entrance of said hydrogen reactor chamber.

3. The hydrogen generating apparatus of claim 1, wherein said high-activity steam reformation catalyst is a supported by nickel-based catalyst.

4. The hydrogen generating apparatus of claim 1 wherein said coke-resistant steam reformation catalyst is a supported doped nickel-based catalysts.

5. The hydrogen generating apparatus of claim 4, wherein said supported doped nickel-based catalyst is comprised of at least one of calcium oxide, potassium oxide and calcium aluminate or combinations thereof.

6. The hydrogen generating apparatus of claim 5, wherein said supported doped nickel-based catalysts is further comprised of at least one noble metal.

7. The hydrogen generating apparatus of claim 6, wherein said at least one noble metal is at least one of platinum, palladium, rhodium, or ruthenium or any combination thereof.

8. The hydrogen generating apparatus of claim 1, wherein said coke-resistant steam reformation catalyst is loaded at an entrance of said steam reformer, followed by said high-activity steam reformation catalyst.

9. The hydrogen generating apparatus of claim 1, wherein the high activity steam reformation catalyst contains at least one noble metal component.

10. The hydrogen generating apparatus of claim 1, wherein the plurality of catalysts are powders or coatings supported on a substrate.

11. The hydrogen generating apparatus of claim 10, wherein said substrate is selected from the group consisting of foams, monoliths, felts and mesh, or any combination thereof.

12. The hydrogen generating apparatus of claim 1, wherein a fuel cell is in fluid communication with the hydrogen generating reactor.

13. A hydrogen generating apparatus wherein hydrogen is generated by steam reformation of a hydrocarbon fuel through staged catalysis, the apparatus comprising:

a hydrogen reactor chamber containing steam reformation catalysts, the catalysts in zones and each zone or portion in physical contact with at least one other zone or portion of a zone;

a mesoscale channeled insert with channels having a height and/or width between 0.01 and 0.5 mm is within the reactor chamber and contains at least a portion of the catalysts;

a feed stream;

an input tube in fluid communication with the reactor chamber which directs all of the feed stream into the reactor chamber through each zone; and an output tube in fluid communication with the reactor chamber for removing the feed stream after it passes through all zones;

wherein the zones are in series, in a predetermined sequential manner;

wherein each physically contacted zone or portion contains different steam reformation catalysts; and wherein said different steam reformation catalysts includes a high-activity steam reformation catalyst, a coke-resistant reformation catalyst and a steam reformation catalyst which promotes a water-gas shift reaction.

14. The hydrogen generating apparatus of claim 13, wherein the end of each zone or portion is in contact with another zone or portion is an abrupt end.

15. The hydrogen generating apparatus of claim 13, wherein the end of each zone or portion is in contact with another zone or portion is characterized by a decreasing gradient of one or more catalysts and an increasing gradient of another.

16. The hydrogen generating apparatus of claim 13, wherein the end of each zone or portion is in contact with another zone or portion is characterized by at least one of a decreasing gradient of one or more catalysts and an increasing gradient of another and an abrupt end.

17. A hydrogen generating apparatus wherein hydrogen is generated by steam reformation of a hydrocarbon fuel, the apparatus comprising:

a single hydrogen reactor chamber in which is disposed a plurality of steam reformation catalysts within mesoscale channels having a height and/or width between 0.01 and 0.5 mm forming a staged configuration, having a series of zones or portions, each zone or portion in physical contact with at least one other zone or portion, containing at least one of a plurality of steam reformation catalysts;

an inlet pipe is in fluid communication with the reactor chamber whereby a feed stream can be directed into the mesoscale channels to a first catalyst zone;

a second catalyst zone within the mesoscale channels in physical contact with the first catalyst and in fluid communication with an outlet pipe;

whereby a feed stream is passed into the reactor via the inlet and all of the feed stream first passes through the first zone then passes through the second zone before passing through the outlet, and the plurality of steam reformation catalysts includes a high-activity steam reformation catalyst, a coke-resistant steam reformation catalyst and a steam reformation catalyst which promotes a water-gas shift reaction.

18. The hydrogen generating apparatus of claim 17, wherein the series of zones or portions comprises a first zone, a second zone, and a third zone, in series, wherein an inlet introduces the feed stream to the first zone, wherein an outlet removes feed stream from the third zone, and wherein all of the feed stream that passes through the first zone must also pass through the second zone before passing through the outlet, and wherein all of the feed stream passing through the first zone must also pass through the third zone before passing through the outlet.

* * * * *